United States Patent [19]

Katoh

[11] Patent Number: 5,675,558
[45] Date of Patent: Oct. 7, 1997

[54] SEEKING CONTROL APPARATUS AND METHOD FOR DISK DRIVES, USING SLEW-RATE LIMIT FOR CONTROL OUTPUT

[75] Inventor: Kikuji Katoh, Tokorozawa, Japan

[73] Assignee: Nippon Telegraph and Telephone Corporation, Tokyo, Japan

[21] Appl. No.: 409,027

[22] Filed: Mar. 23, 1995

[30] Foreign Application Priority Data

Aug. 18, 1994 [JP] Japan .................................. 6-193989

[51] Int. Cl.$^6$ .............................. G11B 5/596; G11B 17/22; G11B 7/00
[52] U.S. Cl. .................... 369/32; 369/44.27; 369/44.25; 369/44.35; 360/78.06; 360/78.07; 360/78.09
[58] Field of Search ........................... 360/78.04, 78.09, 360/78.06, 78.07; 369/32, 44.28, 44.27, 44.25, 44.35

[56] References Cited

U.S. PATENT DOCUMENTS

| | | | |
|---|---|---|---|
| 4,200,827 | 4/1980 | Oswald | 360/78.09 |
| 4,775,903 | 10/1988 | Knowles | 360/78.07 |
| 4,914,725 | 4/1990 | Belser et al. | 360/77.08 |
| 5,095,471 | 3/1992 | Sidman | 369/32 |

FOREIGN PATENT DOCUMENTS

| | | |
|---|---|---|
| 3-30152 | 2/1991 | Japan . |
| 4-182972 | 6/1992 | Japan . |
| 5-135521 | 6/1993 | Japan . |

OTHER PUBLICATIONS

"Vibrationless Acceleration Control of Positioning Mechanisms and its Application to Hard–Disk Drives", The International Conference on Advanced Mechatronics, May 21–24, 1989, Tokyo, Japan, pp. 25–30.

"Mechanical Interaction Suppression in a Dual–Actuator by Trapezoidal Driving", M. Mizukami, Proceedings of 16th Annual Symposium IMCSS, pp. 321–325 (1987).

"Vibrationless Seeking Control Using Slew–Rate Limit For Disk Drives", K. Kato, Second International Conference on Motion and Vibration Control, pp. 728–731 (1994).

"Residual Vibrationless Track Accessing Control For Computer Rigid Disk Drives Using Laplace Transforms Technique", D.K. Mui et al., Adv. Info. Storage Syst., 3:161–171 (1991).

"Structural Vibration Minimized Accelleration Trajectory For Head Positioning Control", Y. Mizoshita et al., The Japan Society of Mechanical Engineers, vol. C, pp. 410–412 (1991).

"Vibrationless Seeking Control Using Slew–rate Limit For Optical Disk Drives", K. Kato, The Japan Society of Mechanical Engineers, vol. IV, 722–723 (1994).

*Primary Examiner*—Frank G. Font
*Assistant Examiner*—Jason D. Vierra Eisenberg
*Attorney, Agent, or Firm*—Finnegan, Henderson, Farabow, Garrett & Dunner, L.L.P.

[57] ABSTRACT

The purpose of the present invention is to provide a method and an apparatus for seeking-control for disk drives, in which (i) the step current waveform at the start of speedup or at the switching from speedup to slowdown is transformed into a current waveform by which the mechanical resonance of the disk drive is difficult to be excited; (ii) the lowering of tracking accuracy is prevented; and (iii) the effective seek time being measured from the seek start up to the time at which the writing or reading of the disk becomes possible can be shortened. The seeking control apparatus for disk drives according to the present invention comprises a reference velocity generator for generating a reference velocity which is defined as a function of the number of residual tracks; a subtracter for detecting a velocity difference between a moving velocity of a read-write device of a disk drive to be controlled and the reference velocity, and outputting the detected difference; a proportional amplifier for amplifying the output from the subtracter; a slew-rate limiter for limiting a rate of change of the control output from the proportional amplifier lower than a predetermined level, and outputting a limited output; and a power amplifier for amplifying the output from the slew-rate limiter and outputting positioner current.

27 Claims, 9 Drawing Sheets

SEEKING CONTROL APPARATUS AND METHOD FOR DISK DRIVES, USING SLEW-RATE LIMIT FOR CONTROL OUTPUT

BACKGROUND OF THE INVENTION

1. Field of the Invention

The present Invention relates to a method for moving a read-write means, such as a magnetic head in a magnetic disk drive or a (laser) beam in an optical disk drive, from the track on which the read-write means is on to another track, and relates to an apparatus for implementing the method.

2. Background Art

FIG. 9 is a block diagram showing a conventional seeking control apparatus A for disk drives. In FIG. 9, reference numeral 1 indicates a reference velocity generator, reference numeral 2 indicates a proportional amplifier for the proportional control, reference numeral 3 indicates a power amplifier, reference numeral 4 indicates a feedforward output generator for the control in the slow-down stage, reference numeral 5 indicates a subtracter, reference numeral 6 indicates an adder, and reference numeral 7 indicates a selector switch.

The seeking control apparatus A in FIG. 9 moves a magnetic head or a laser beam (hereinafter, referred to as a read-write device for convenience) from the track on which the read-write device is on to another track (i.e., a target track) under control in a manner such that the moving velocity of the read-write device relative to the disk is the same as a reference velocity which is defined as a function of the number of tracks being counted from the present track up to the target track (that is, the number of residual tracks).

The current output from power amplifier 3 is supplied to a positioner (not-shown) which is a movement mechanism for positioning. In reference velocity generator 1, a reference velocity table, in which a relationship between the position and the velocity of the positioner is defined, is stored.

When the read-write device reaches the target track, the control is switched from the seeking control to the tracking control, and the read-write device follows the target track.

Feedforward output generator 4 is provided in order to decrease the error between the reference velocity and the actual moving velocity (that is, the velocity deviation) in the slow-down stage, which occurs when the gain of the seeking control system is finite.

Feedforward output generator 4 begins to operate when the seeking control ends the present stage, in which the read-write device approaches the target track while increasing the moving velocity, and comes into a next stage in which the read-write device approaches the target track while maintaining a constant velocity or slowing down. In the feedforward output generator 4, a function table is stored in which a physical quantity corresponding to the acceleration which should be generated by the positioner is defined as a function of the number of tracks being counted from the present track up to the target track (that is, the number of residual tracks) in the case of moving the positioner in accordance with the reference velocity table.

In the seeking control conducted by this seeking control apparatus, the design of the reference velocity is important for shortening the seek time. The relationship between the displacement and the velocity of the positioner which is seeking can be specified by integrating the current (which corresponds to the acceleration) flowing within the positioner; thus, it is possible to say that explaining the reference velocity is equivalent to explaining the waveform of the current. Therefore, hereinbelow, the waveform of the current will be explained instead of the reference velocity.

In the case in which the value of the current during the seeking has an upper limit, the Bang-Bang control can theoretically realize the shortest seek time, and the current waveform of this case is shown in FIG. 10.

However, in practice, such a waveform as is shown in FIG. 10 causes the following two problems. First, with the purpose of realizing stable positioning of the read-write device with respect to the target track after seeking, the switching from speedup to slowdown must be strictly performed at the time corresponding to half of the seek time. Second, the mechanical resonance of the disk drive stimulated by the step current causes vibration, by which the tracking accuracy after seeking is lowered; accordingly, the effective seek time, being measured from the seek start up to the time at which the recording (writing) or reproducing (reading) of the disk becomes possible, is extended.

In the past, the problem of exciting vibrations by the step current was mainly solved by changing the step-type waveform at the end of seeking (i.e., at time $t_e$ in FIG. 10) to a gradually decreasing waveform for the following reasons. That is, magnetic disk drives, which had large accelerations for seeking, had relatively large track pitch, whereas optical disk drives, which had small track pitch, had relatively small acceleration; therefore, the vibrations excited at the starting (time 0) of seeking and the changing ($t_e/2$) of seeking were damped before the end of seeking, and no serious effect was exerted on the tracking accuracy.

The seek time of the case of this solution is longer than that of the case of the Bang-Bang control. However, the lowering of the tracking accuracy is suppressed because of non-excitation of vibration immediately before the end of seeking; thus, the effective seek time, which is measured from the seek start-up to the time at which the writing or reading of the disk becomes possible, is shortened. In addition, if the switching point from speed up Lrp to slowdown shifts from the point corresponding to half of the seek time, the delay of the switching can be corrected within a section in which the current immediately before the end of seeking gradually decreases; thus, the permissible range of the switching is widened and the stability of the track pull-in is raised.

However, in the conventional method, if the track pitch of the disk is narrowed, or if the acceleration of seeking is raised, vibrations caused at the start of speedup or at the switching from speedup to slowdown lower the seeking accuracy, by which the effective seek time is made longer. This is a problem.

SUMMARY OF THE INVENTION

Therefore, the present invention has the following objects.

The first object is to provide a method and an apparatus for seeking-control for disk drives, in which the step current waveform at the start of speedup or at the switching from speedup to slowdown is transformed into a current waveform by which the mechanical resonance of the disk drive is difficult to be excited.

The second object is to provide a method and an apparatus for seeking-control for disk drives, in which the lowering of the tracking accuracy is prevented.

The third object is to provide a method and an apparatus for seeking-control for disk drives, in which the effective seek time being measured from the seek start up to the time at which the writing or reading of the disk becomes possible can be shortened.

The fourth object is to provide a seeking control apparatus for disk drives, which includes at least a reference velocity generator, a subtracter, a proportional amplifier, and a slew-rate limiter.

Other objects of the present invention will be apparent by the following description and the appended figures.

Therefore, the present invention provides:

(i) a seeking control method for disk drives, the method comprising steps of: detecting a velocity difference between a moving velocity of a read-write means of a disk drive to be controlled and a reference velocity which is defined as a function of the number of residual tracks; generating a control output which is proportional to the detected velocity difference by velocity feedback control; and limiting a rate of change of the control output to be lower than a predetermined level; and (ii) a seeking control apparatus for disk drives, the apparatus comprising: a reference velocity generator for generating a reference velocity which is defined as a function of the number of residual tracks; a subtracter for detecting a velocity difference between a moving velocity of a read-write means of a disk drive to be controlled and the reference velocity, and outputting the detected difference; a proportional amplifier for amplifying the output from the subtracter; a slew-rate limiter for limiting a rate of change of the control output from the proportional amplifier to be lower than a predetermined level, and outputting a limited output; and a power amplifier for amplifying the output from the slew-rate limiter and outputting positioner current.

Preferably, in the above-mentioned seeking control method and apparatus, a few kinds of reference velocities, for example, reference velocities for speedup and slowdown, or, reference velocities for speedup, constant-speed and slowdown, are prepared, and such reference velocities are used while switching from one reference velocity to another in turn.

According to the present invention, the rate of change of the output from the proportional amplifier is limited to below a constant value; thus, it is possible to realize seeking control with small residual vibration after the end of seeking and to reduce the effective seek time being measured from the seek start to the time at which the recording (writing) or reproducing (reading) of the disk becomes possible. As a result, it is possible to improve the seeking efficiency of disk drives.

DETAILED DESCRIPTION OF THE PREFERRED EMBODIMENTS

Example of the Apparatus

Hereinafter, an example of the apparatus according to the present invention will be explained with reference to the figures.

Figure 1:
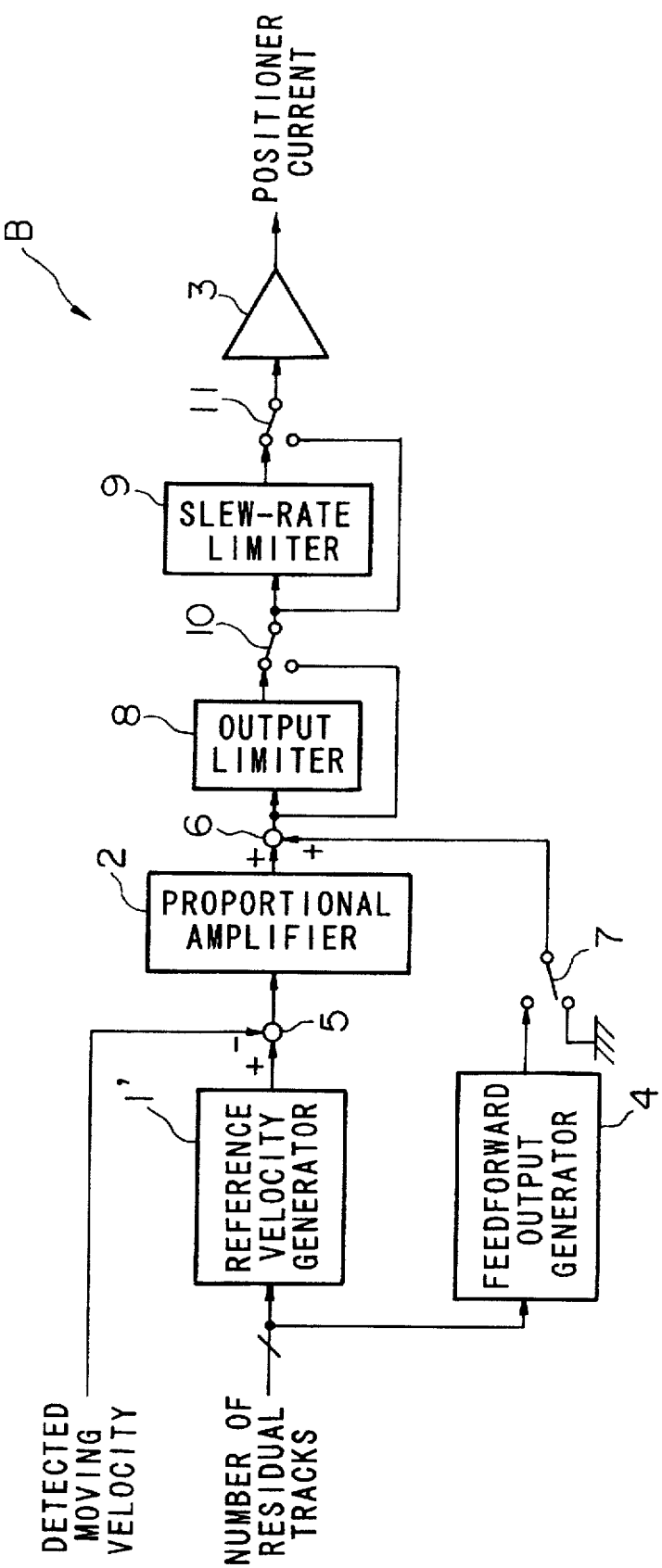
FIG. 1 is a block diagram showing the seeking control apparatus for disk drives according to an embodiment of the present invention.
Figure 9:
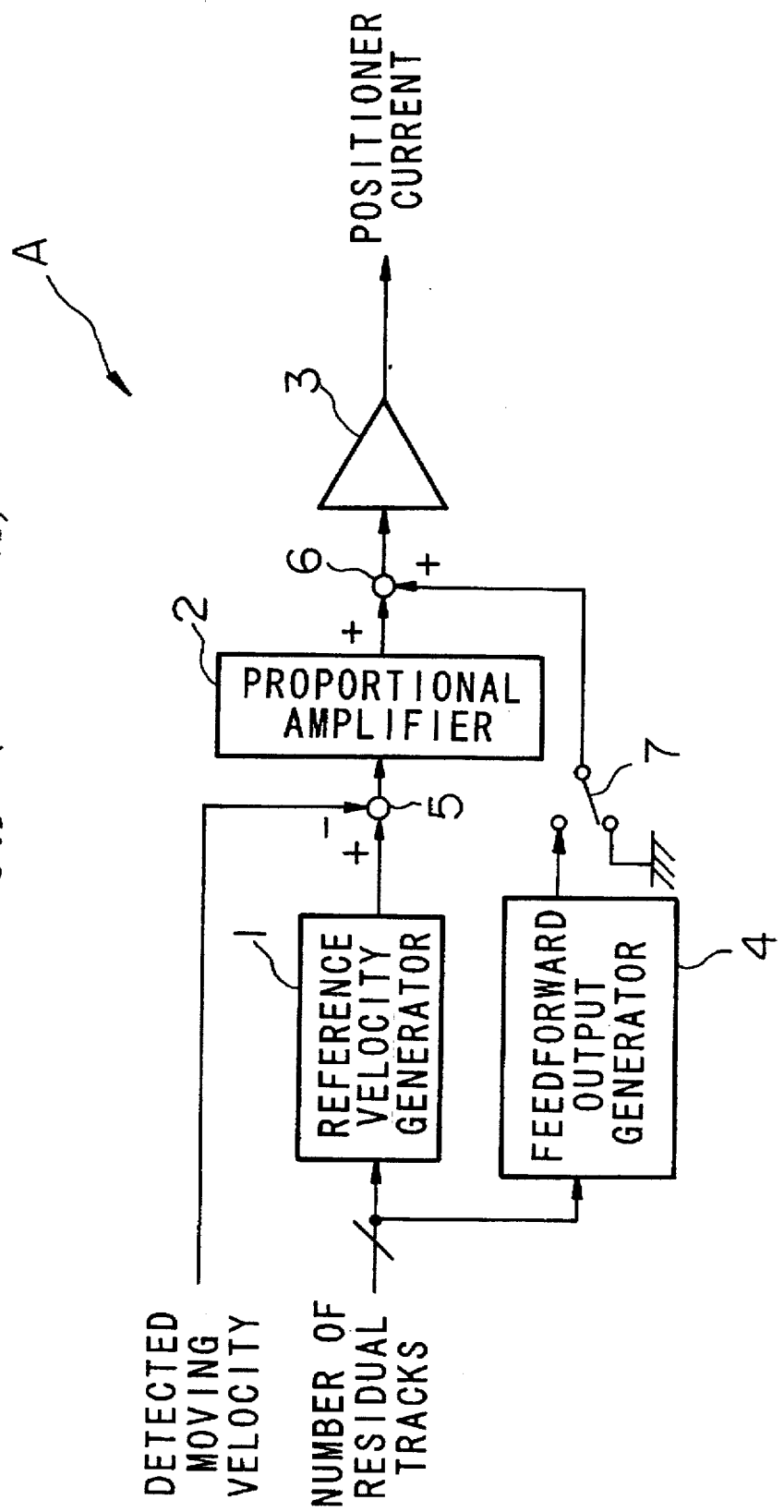
FIG. 9 is a block diagram showing a conventional seeking control apparatus for disk drives.
Figure 10:
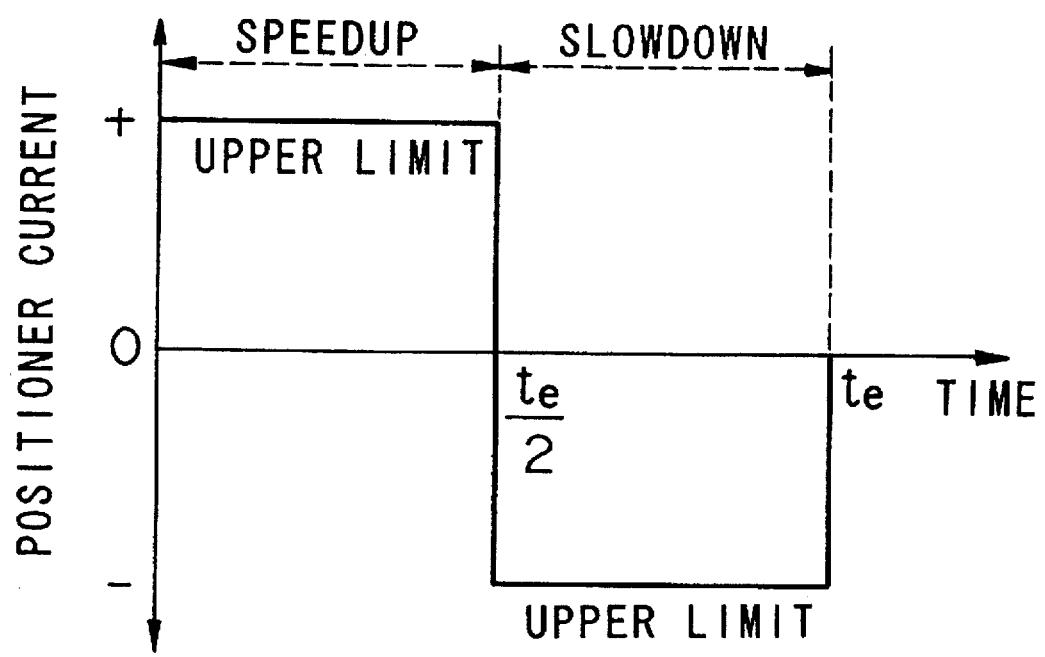
FIG. 10 is a current waveform chart in the Bang-Bang control which theoretically realizes the shortest seek time.

FIG. 1 is a block diagram showing the seeking control apparatus B for the disk drives according to an embodiment of the present invention. In FIG. 1, reference numeral 1' indicates a reference velocity generator, reference numeral 8 indicates an output limiter, reference numeral 9 indicates a slew-rate limiter, and reference numerals 10 and 11 indicate selector switches. In the figure, parts which are identical to those shown in FIG. 9 are given identical reference numbers.

That is to say, apparatus B-comprises elements 2–7 which perform the velocity feedback control similar to that of apparatus B, and new elements 1', 8, and 9, that is, reference velocity generator 1' which generates three kinds of reference velocities (for speedup, constant-speed, and slowdown) output limiter 8 which limits the maximum value of the output of the velocity feedback control, and slew-rate limiter 9 which limits the rate of change of the output of the velocity feedback control.

Reference velocity generator 1' generates one of three kinds of reference velocities for speedup, constant-speed, and slowdown while switching them in turn, by which a control output for seeking is generated.

Output limiter 8, which is provided in order to raise the accuracy of the design of the reference velocity for the speedup limits the maximum value of the control output to a level which corresponds to the maximum value of the positioner current.

Slew-rate limiter 9 transforms the form of the control output from the output limiter 8 into a form whereby the mechanical resonance of the disk drive is difficult to be excited.

Power amplifier 3 transforms the output from the slew-rate limiter 9 into positioner current.

Method Example

Hereinbelow, the procedures for implementing the method of the present invention, which is applied to the present apparatus, will be explained.

First, the procedures for treating a waveform by which the mechanical resonance of the disk drive is difficult to be excited.

The disk drive has some points of mechanical resonance. However the tracking accuracy immediately after seeking is dominated by the residual vibration of a point of mechanical resonance which has a small damping coefficient. Therefore, the waveform which does not easily excite the mechanical resonance with a small damping coefficient will be examined below.

Figure 2:
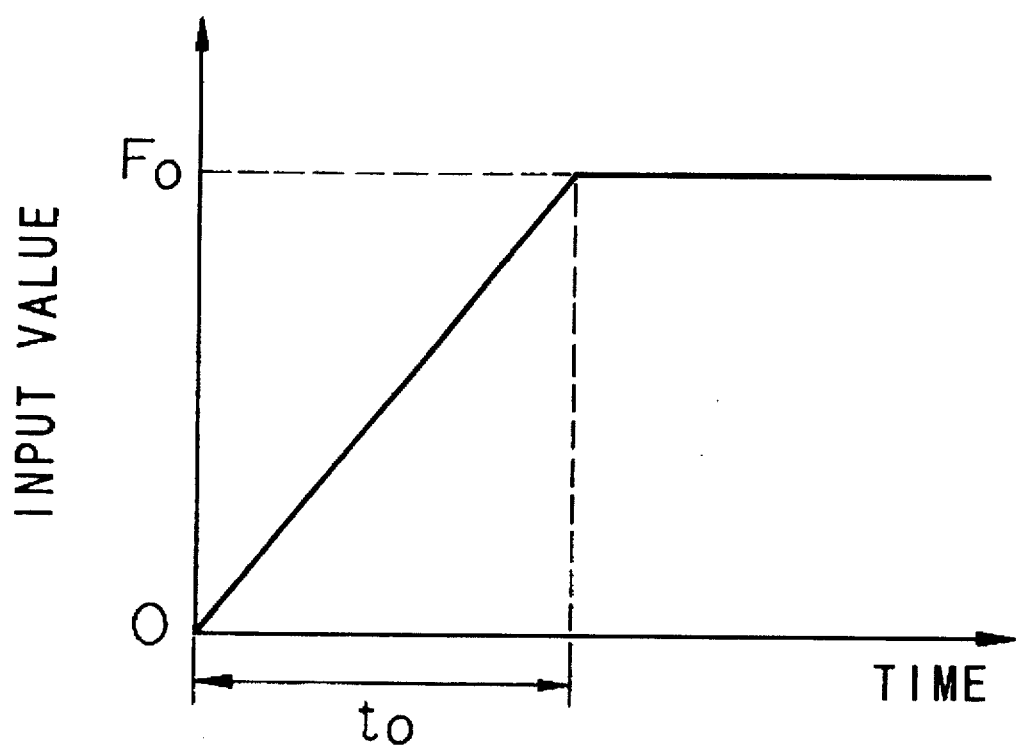
FIG. 2 is a waveform chart of step input which has a rise of constant slope.

Now, the above-mentioned dominant mechanical resonance is modeled by a spring-mass system, and it is assumed that the damping coefficient is zero for the purpose of simplifying analysis: In the case in which the step input, shown in FIG. 2, which has a rise of constant slope is given to this vibration system, it is well known that the maximum response is represented by the following formula (1), in which $F_0$ means the maximum value of the input, k means the spring constant, $\omega_n$ represents the resonance frequency, and $t_0$ is the rise time.

$$x = (F_0/k) \cdot (1 + (\sqrt{(2(1-\cos\omega_n t_0))})/\omega_n t_0) \quad (1)$$

According to formula (1), if rise time $t_0$ is equal to an integer multiple of $2\pi/\omega_n$, the maximum response x of the vibration system becomes equal to the maximum value $F_0/k$ of static displacement which is generated due to the input $F_0$. This means that no residual vibration with respect to this resonance occurs.

In accordance with the above examination, in the apparatus B, a waveform, which is obtained by transforming the control output from output limiter 8 by means of slew-rate limiter 9, is used, the waveform having a rise time corresponding to an integer multiple of the period of the mechanical resonance which lowers the tracking accuracy immediately before the end of seeking.

Figure 3:
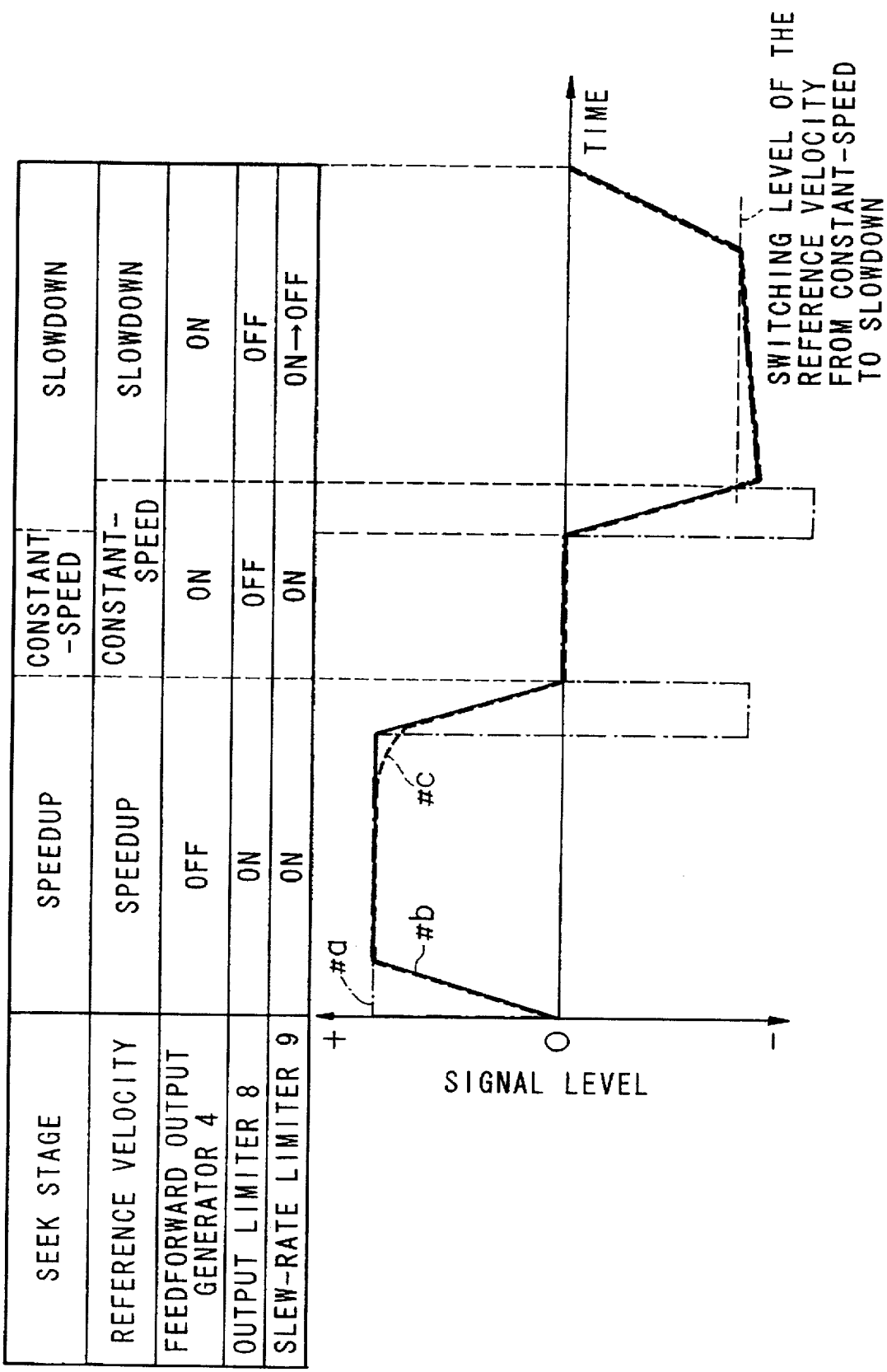
FIG. 3 is a timing chart for explaining the on-off timings of some of the elements in the apparatus, and control outputs immediately before the slew-rate limiter and immediately before the power amplifier, and the positioner current.

In FIG. 3, the on-off timings of feedforward output generator 4, output limiter 8, and slew-rate limiter 9 in the apparatus, and control outputs (control output signals) immediately before slew-rate limiter 9 and immediately before power amplifier 3, and the positioner current. In the figure, #a indicates the control output immediately before slew-rate limiter 9, #b indicates the control output immediately before power amplifier 3, and #c indicates the positioner current.

In the speedup stage, control output #a is generated by using the reference velocity for speedup, and control output #b, having a rise of constant slope and a fall of constant slope, is generated by limiting the slew-rate of the control output #a. When the level of control output #b reaches zero, the reference velocity to be generated is changed from that for speedup to that for constant-speed in order to make the control output #a zero quickly. This is because, if control output #a remains as a large value, the transient response becomes large and the control becomes unstable. Then, the starting of feedforward control and the disconnection of output limiter 8 are executed via selector switches 7 and 10.

In the constant-speed stage, control output #a is generated by using the reference velocity for constant-speed, and control output #b, having a fall of constant slope, is generated by limiting the slew-rate of the control output #a. When the level of control output #b reaches a voltage value which is calculated by a designed value for the slew-rate limitation and a designed value for the fall time, the reference velocity to be generated is changed from that for constant-speed to that for slowdown in order to suppress the generation of transient response.

In the slowdown stage, the design is conducted by using the reference velocity for slowdown, in a manner such that the control outputs #a and #b are the same. Therefore, slew-rate limiter 9 is not necessary. When the slope of control output #b becomes zero or positive, slew-rate limiter 9 is disconnected via selector switch 11.

Hereinafter, the process for designing the reference velocity will be explained with reference to FIG. 4.

In the figure, #c' indicates designed positioner current, and #b' indicates designed control output immediately before power amplifier 3. Designed current #c' is designed in consideration of counter-electromotive force generated in the positioner. In the speedup stage, the counter-electromotive force decreases the possible maximum current supplied to the positioner in proportion to the speed of the positioner. In contrast, in the slowdown stage, the counter-electromotive force increases such maximum current. Here, It should be noted that the time axis in FIG. 4 is represented converse to the actual seeking operation, that is, time 0 indicates the end point of seeking.

The displacement and velocity of the moving positioner can be calculated by integrating the positioner current. Therefore, the reference velocity, which is defined as a function of the number of tracks being counted from the present track up to the target track (that is, the number of residual tracks), can be set by means of setting the displacement which corresponds to the number of residual tracks up to the target track and the moving velocity at the end point of seeking, and integrating designed current #c' from the end point of seeking up to the starting point of seeking with the above-set displacement and moving velocity as initial conditions.

The reference velocities for slowdown and constant-speed are calculated by integrating the designed current #c' up to each switching point of the reference velocity, which was explained with reference to FIG. 3. That is, in FIG. 4, the reference velocity for slowdown is obtained by integrating #c' from time 0 to $T_d$, the reference velocity for constant-speed is obtained by integrating #c' from time 0 to $T_c$, and the reference velocity for speedup is obtained by integrating #c' from time 0 to $T_a$.

Here, $T_a$ can be determined by the following formula (2), in which $V(T_a)$ is velocity at time $T_a$, which is calculated from the designed current #c', and $V(T_s)$ is velocity at time $T_s$ which corresponds to the end point of the rise of constant slope of the designed control output #b' (note that, in the actual seeking, time $T_s$ corresponds to the starting point of the fall with constant slope because of the opposite time scale).

$$V(T_a) = V(T_s) + V_{error} \quad (2)$$

$V_{error}$ in formula (2) is a velocity error (difference) necessary for forming designed control output #b' which is equal to the maximum value of output limiter 8, and $V_{error}$ can be obtained by calculating the following formula (3).

$V_{error}$(m/s)=maximum acceleration (m/s$^2$) for speedup/overall gain (1/s) of the seeking control system (3)

wherein:
  overall gain (1/s) of the seeking control system= sensitivity (V/(m/s)) for detecting velocity×gain (V/V) of the seeking control apparatus×voltage-current transformation coefficient (A/V) of the power amplifier× thrust constant ((m/s$^2$)/A) of the positioner.

Here, each symbol in the parentheses in the above formulas indicates the unit of the quantity.

Next, $T_a$ has the following meaning. The function of the slew-rate limitation of slew-rate limiter 9 becomes effective when the rate of change of the control output immediately before slew-rate limiter 9 becomes larger than a predetermined limit value of the slew-rate limiter. That is, to realize this function at the last stage in the speedup, it is requested to satisfy the condition in that at the time of starting of the operation of the slew-rate limiter (i.e., time $T_s$ in FIG. 4), the difference between the reference velocity for speedup and the detected moving velocity has a value necessary for generating a control output whose level is near to the maximum value 1lmited by the output limiter.

Therefore, the reference velocity for speedup (the left side of formula (2)) was defined as the sum of the moving velocity at time $T_s$ (the first term of the right side of formula (2)) and the velocity error necessary for generating a control output whose level is equal to the maximum value limited by the output limiter (the second term of the right side of formula (2)).

Next, $T_{min}$ and $T_{nf}$ are design parameters provided for suppressing the generation of residual vibration.

Parameter $T_{min}$ indicates a widening of the permissible range for the timing of switching from speedup to slowdown, as described in the explanation for the conventional method, and increasing the stability for the track pull-in after track seeking. Therefore, $T_{min}$ is set to a value larger than the period of mechanical resonance. As a result, almost no mechanical resonance is excited in $T_{min}$ and the residual vibration is very small.

Parameter $T_{nf}$ indicates the operation period in which the apparatus operates with the slew-rate designed current #c' being equivalent to a designed value of slew-rate limiter 9. The excitation of the resonance can be suppressed by setting the period $T_{nf}$ as an integer multiple of the period of mechanical resonance which is a target for suppression. Period $T_{nf}$ varies according to the seek distance due to the effect of counter-electromotive force of the positioner; thus, it is important that, in the selection of the limit value of the slew-rate limiter, which operation period of the corresponding seek distance is to be an integer multiple of the period of the mechanical resonance.

The tracking accuracy after seeking tends to be worse in short-distance seeking in which the vibrations occurring at the time of changing from speedup to slowdown is not sufficiently damped. Accordingly, the slew-rate limit value should be designed in a manner such that the operation time ($T_{nf}$) in the short-distance seeking is an integer multiple of the period of the mechanical resonance.

Moreover, although power amplifier 3 is driven in the current-driven mode, the current (#c') does not always vary like the control output (#b') because of the inductance of coils in the positioner. Therefore, $T_{nf}$ should be selected from integer multiples of the period of the mechanical resonance also in consideration of the response of the current.

If it is requested that reference velocity be designed in no consideration with the influence of counter-electromotive force regardless of the seeking distance, such design is possible by setting the maximum value of designed current (#c') to be lower than a value at which no influence of counter-electromotive force is burdened on the apparatus.

Figure 4:
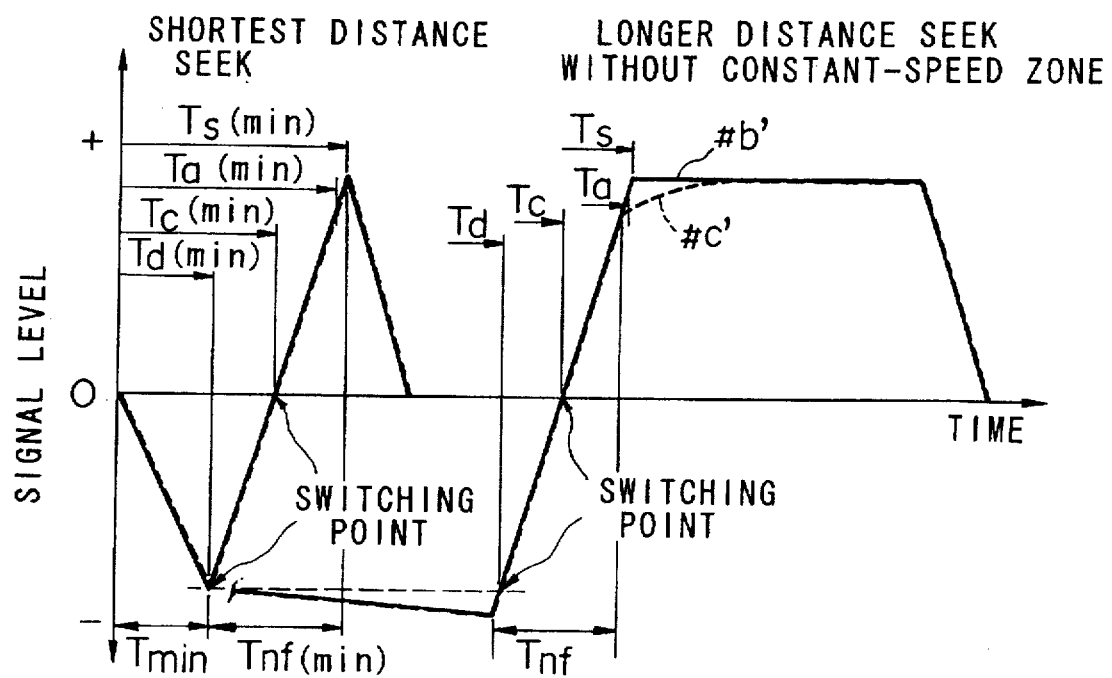
FIG. 4 is a timing chart for explaining the method of designing the reference velocity, the method being adopted in an example of the method of the present invention.

For example, in the slowdown stage, the maximum value of designed current (#c') should be a value without expecting any increment based on the counter-electromotive force (the value corresponds to the level of the dotted line in FIG. 4, which is a comparative level for switching the reference velocity from that for constant-speed to that for slowdown).

On the other hand, in the speedup stage, the maximum value of designed current (#c') should be a value which can always be achieved, even in consideration of the decrement based on the counter-electromotive force.

In addition, in order to select the reference velocity without the consideration of the influence of counter-electromotive force regardless of the seeking distance, it is necessary that, beside the above conditions, the value of output limiter 8 which operates in the speedup stage should be set as corresponding to the maximum value of designed current (#c') in the speedup stage.

Experimental Example

Figure 5:
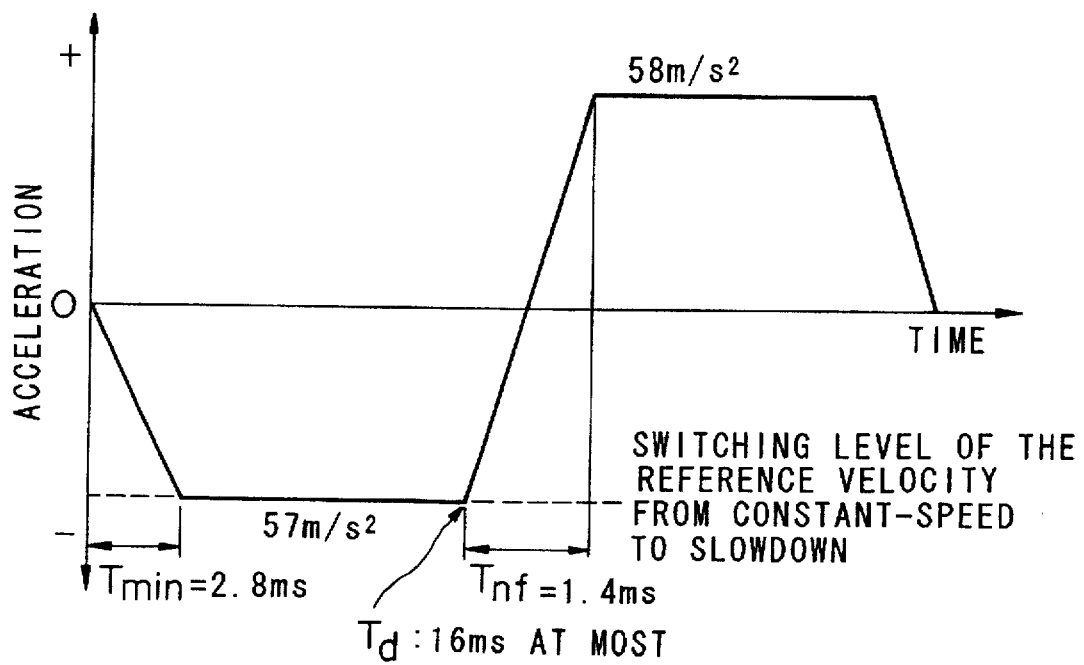
FIG. 5 is a waveform chart of the designed acceleration (corresponding to "current") used for designing the reference velocities which are supplied for the experiment for proving the effectiveness of the present invention.
Figure 6:
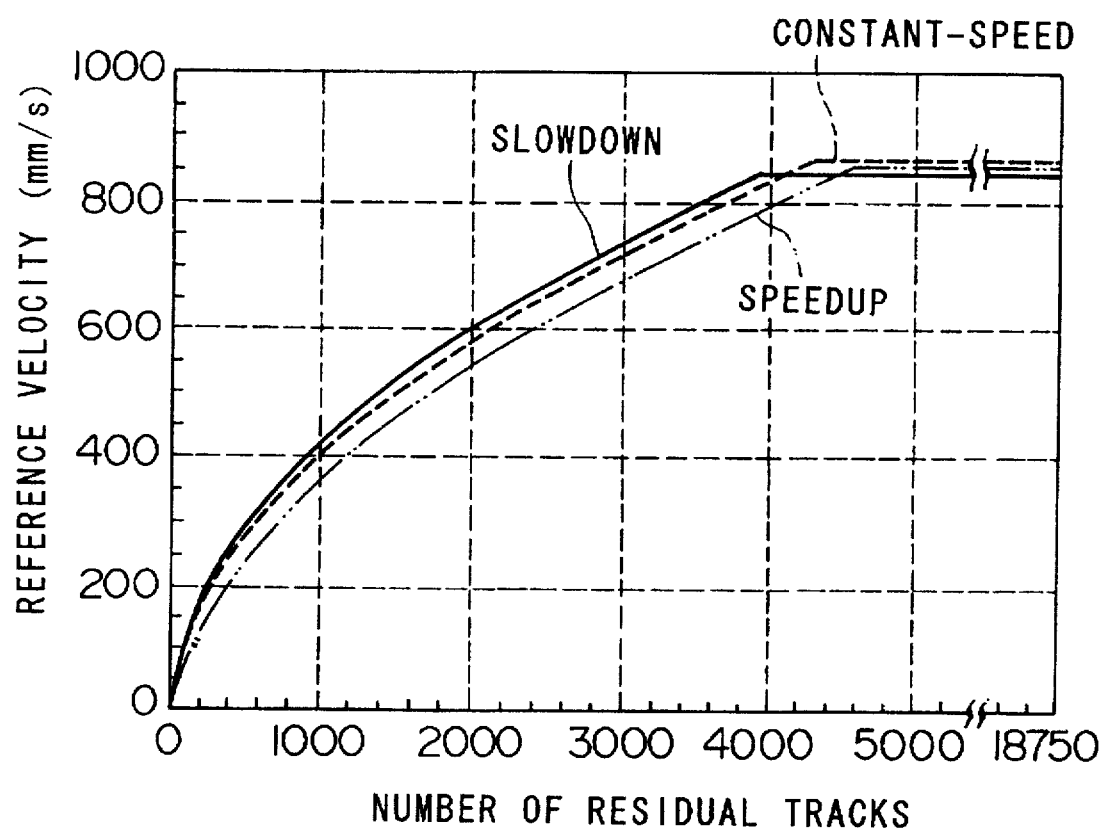
FIG. 6 shows three kinds of reference velocities for speedup, constant-speed, and slowdown which are obtained by integrating the waveform in FIG. 5.

FIG. 5 shows the waveform of the designed acceleration (corresponding to "current") for designing the reference velocity which is supplied for the experiment for proving the effectiveness of the present invention. FIG. 6 shows three kinds of reference velocities for speedup, constant-speed, and slowdown obtained by integrating the waveform in FIG. 5. Also in FIG. 5, time 0 corresponds to the end point of seeking.

In the selection of reference velocities, no consideration is given to the influence of counter-electromotive force regardless of the seeking distance, although the maximum acceleration (corresponding to thrust force) as potential ability was 64 m/s$^2$, the maximum acceleration for speedup was set equal to 58 m/s$^2$, while the maximum acceleration for slowdown was set equal to 57 m/s$^2$, as shown in FIG. 5. In addition, the limit value of output limiter 8 is set to be a value which corresponds to the maximum value 58 m/s$^2$ in the speedup stage.

The following is a reason for setting the maximum value for slowdown to be lower than that for speedup. It is necessary to control velocity variation in the slowdown stage, which is caused by an eccentric track, in order to perform stable track pull-in after seeking. In this Experimental Example, the amplitude of acceleration due to track eccentricity was expected to be 7 m/s$^2$; thus, the maximum acceleration for slowdown was set equal to 57 m/s$^2$, which is obtained by subtracting the amplitude 7 m/s$^2$ of acceleration of the track eccentricity from the maximum acceleration 64 m/s$^2$ as the potential ability of the posit loner.

Next, time $T_{nf}$ in which the acceleration varies from 58 m/s$^2$ for speedup to −57 m/s$^2$ for slowdown is set equal to 1.4 ms, which is twice the period of the mechanical resonance at 1.43 kHz, in consideration of the response of the current. Time $T_{min}$ is set equal to 2.8 ms which is four times the period of the above-mentioned mechanical resonance. On the other hand, $V_{error}$ which is necessary for calculating $T_a$ according to formula (2), is specified as 10 mm/s by calculating formula (3).

Previous to the calculation of reference velocities shown in FIG. 6, the residual distance up to the target track and the moving velocity at the end point of seeking are assumed, respectively, as 0 μm and 9.3 mm/s, both being used for initial values for integration.

To design the reference velocity for slowdown, the maximum value of time $T_d$ (i.e., the maximum value of integration period 0~$T_d$) was set equal to 16 ms. Then, while increasing time with a very small pitch until the time $T_d$ reaches 16 ms, each position and the corresponding velocity were calculated. For greater distances, the velocity obtained at "$T_d$=16 ms" was constantly assigned. Then, the obtained positions were converted into a series of integers based on the track pitch of 1.6 μm, and the result was shown in graph form as "reference velocity" versus "the number of residual tracks".

To design the reference velocity for constant-speed, the maximum value of time $T_c$ was obtained by the following relationship:

(Maximum value of $T_d$)+{$T_{nf}$×57 m/S$^2$ /(57 m/S$^2$ +58 m/S$^2$)}, and the result was 16.7 ms. Then, while increasing time with a very small pitch until the time $T_C$ reaches 16.7 ms, each position and the corresponding velocity were calculated. For greater distances, the velocity obtained at "$T_c$=16.7 ms" was constantly assigned. Then, the obtained positions were similarly converted to a series of integers based on the track pitch of 1.6 μm, and the result was shown in graph form as "reference velocity" versus "the number of residual tracks".

To design the reference velocity for slowdown, the maximum value of time $T_a$ was obtained by formula (2) under the following conditions:

$V_{error}$=10 mm/s $T_s$=(Maximum value of $T_d$+$T_{nf}$)=17.4 ms, and the result was 17.2 ms. Then, while increasing time with a very small pitch until the time $T_a$ reaches 17.2 ms, each position and the corresponding velocity were calculated. For greater distances, the velocity obtained at "$T_a$=17.2 ms" was constantly assigned. Then, the obtained positions were similarly converted to a series of integers based on the track pitch, and the result was shown in a similar graph form.

These three kinds of reference velocity data are stored in reference velocity generator 1' in table form with respect to the position (here, the number of residual tracks), and the reference velocity generator 1' refers to the table in the seeking.

Comparative Example

Figure 7A:
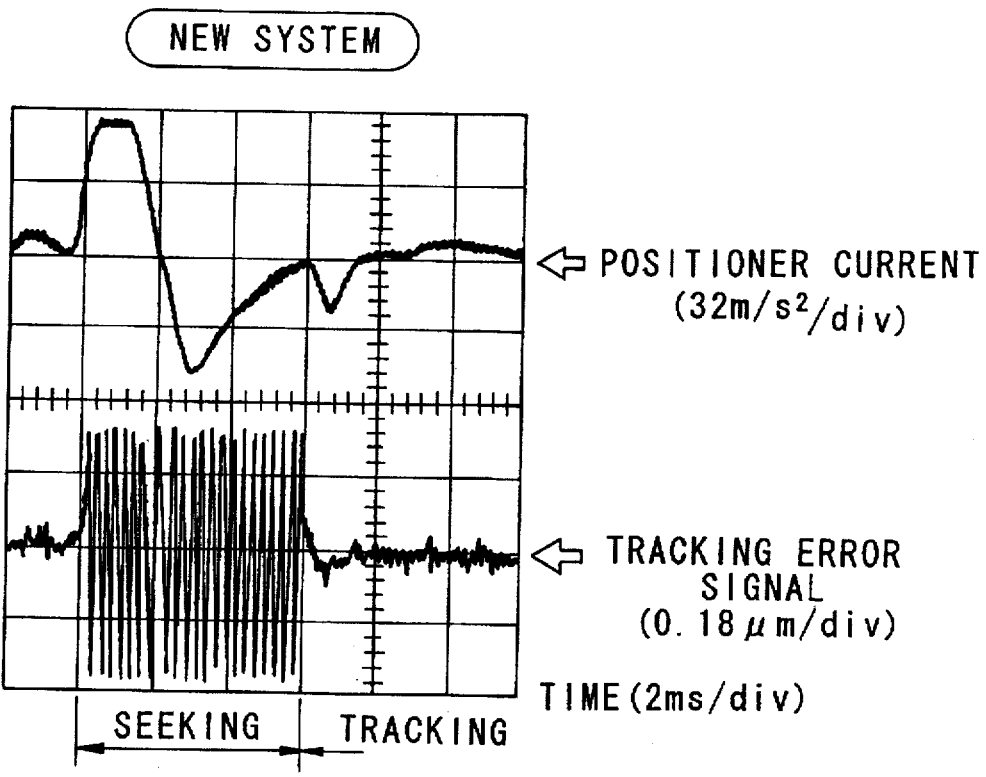
FIGS. 7A and 7B show the positioner current and the tracking error signal when a laser beam of an optical disk drive was positioned at an target track which was 128 tracks away from the present track, by in the case of FIG. 7A, the present apparatus B, while in the case of FIG. 7B, the conventional apparatus A.
Figure 7B:
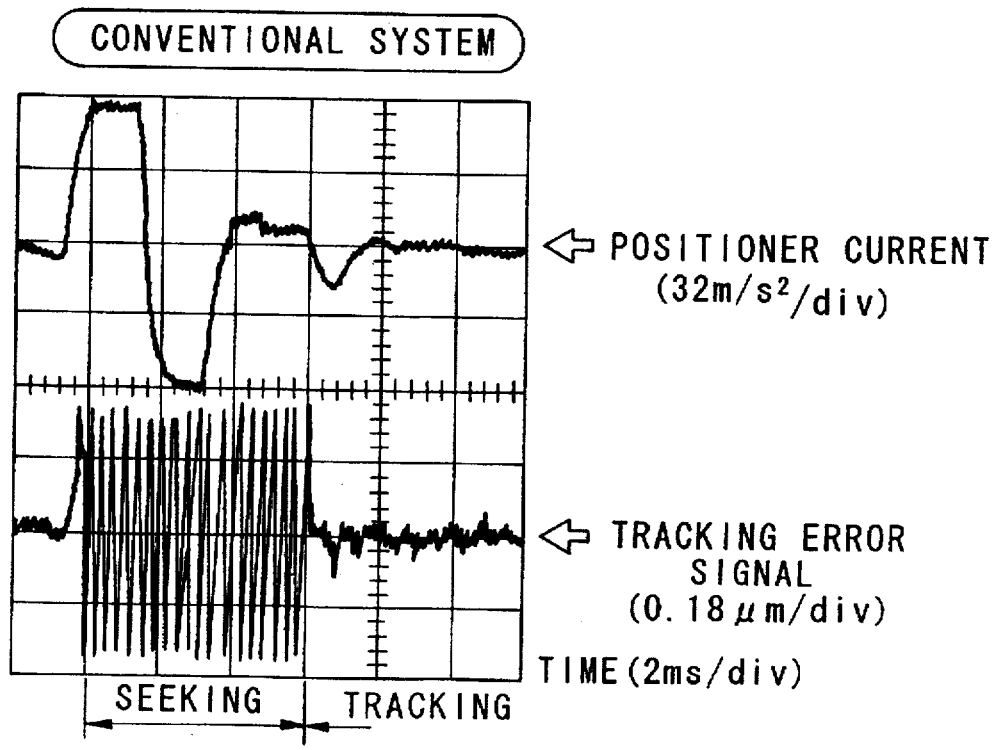

FIG. 7A shows the positioner current and the tracking error signal when a laser beam (spot) of an optical disk drive was positioned at a target track, which was 128 tracks away from the present track, by using the present seeking control apparatus B. Similarly, FIG. 7B shows the positioner current and the tracking error signal when the same positioning was performed by using the conventional seeking control apparatus A.

Here, the three kinds of reference velocities shown in FIG. 6 were used for the seeking control apparatus B. On the other hand, the reference velocity for slowdown in FIG. 6 was used for the conventional seeking control apparatus A. In addition, the feedforward (function) tables for slowdown was designed based on each reference velocity in each case of seeking control apparatus A and B. According to FIGS. 7A and 7B, it is obvious that the tracking accuracy after seeking of the present seeking control apparatus B is improved compared to that of the conventional seeking control apparatus A.

Figure 8:
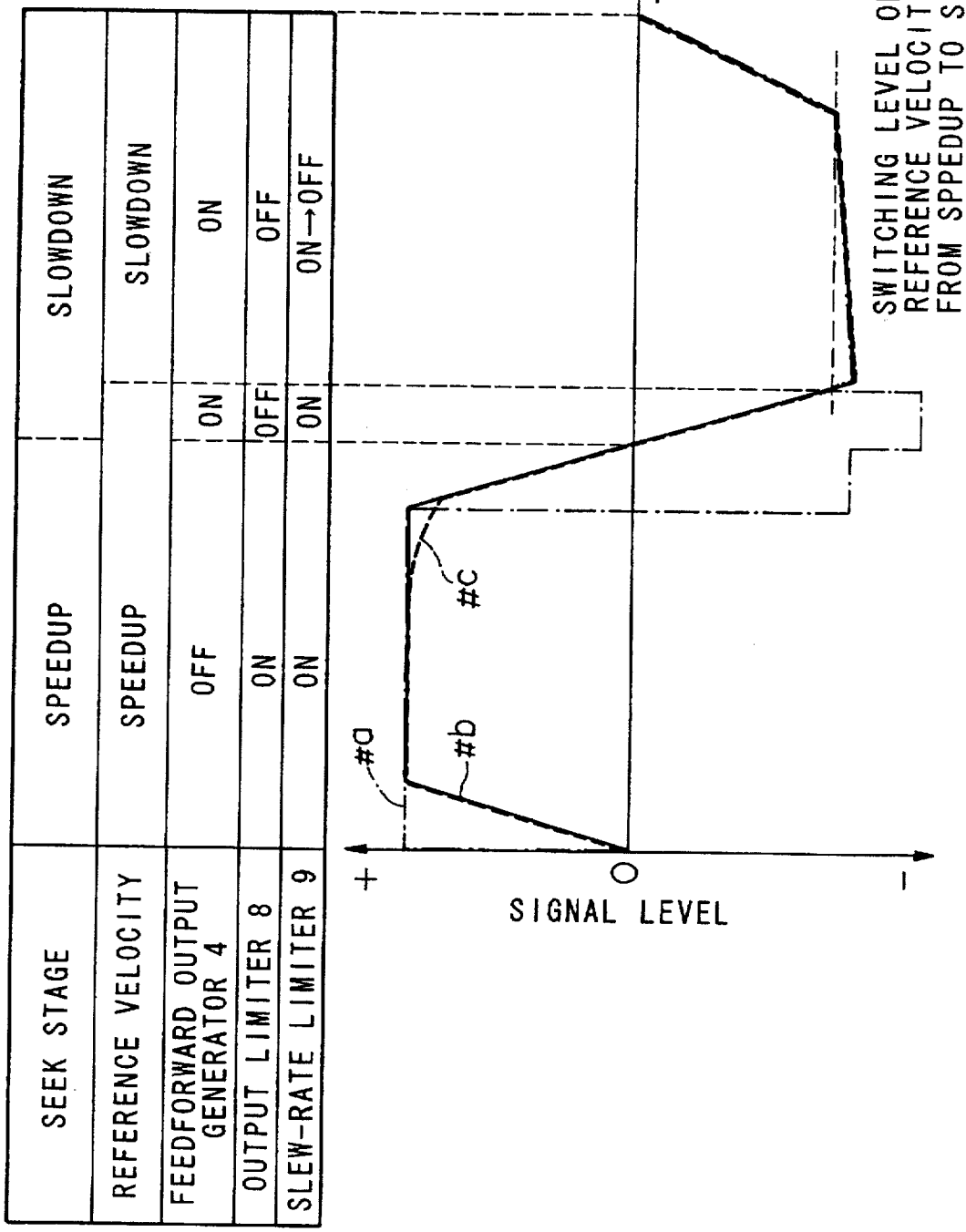
FIG. 8 is a timing chart for explaining the on-off timings of some of the elements in the apparatus, and control outputs immediately before the slew-rate limiter and immediately before the power amplifier, and the positioner current, in the case in which no control section for constant-speed is assigned regardless of the seeking distance and the seeking is constructed only by two sections for speedup and slowdown.

In the present apparatus, for long-distance seeking, the section in which the velocity is controlled to be constant is provided. This is for the purpose of reducing the heat-generation by the positioner coil in the case of long-distance seeking. For this purpose, the reference velocity for constant-speed is also necessary, in addition to those for speedup and slowdown; that is, three kinds of reference velocities are used. However, if such ability to control the velocity to be constant is not provided, no reference velocity for constant-speed is needed and two kinds of reference velocities for speedup and slowdown are sufficient for use. In this case, the on-off timings of the three elements of the apparatus B (shown in FIG. 3) and each waveform are as shown in FIG. 8.

Moreover, the following is another purpose of providing output limiter 8, in addition to the purpose of enabling to design the reference velocity with no consideration of the counter-electromotive force. That is, it is intended that even in the case of selecting the reference velocity in consideration of the counter-electromotive force, the number of parameters which should be considered in the selection of reference velocity for speedup is reduced, by means of setting the maximum value of the control output, which is determined by the source voltage supplied to the seeking control apparatus B, to be a value which corresponds to the maximum value of the positioner current, by which the difference between the waveform of the control output and the waveform of the actual positioner current due to the slew-rate limiting or variation of the source voltage is restricted. Therefore, it is not necessary to provide the output limiter 8 if it does not matter that the design may become a little more complicated.

What is claimed is:

1. A seeking control method for disk drives, the method comprising steps of:

detecting a velocity difference between a moving velocity of a read-write means of a disk drive to be controlled and a reference velocity which is defined as a function of the number of residual tracks;

generating a control output which is proportional to the detected velocity difference;

limiting rate of change of the control output to be lower than a predetermined level; and converting the control output, which experienced the step of limiting a rate of change, into current supplied to a positioner.

2. A seeking control method for disk drives as claimed in claim 1, further comprising a step of:

limiting the upper limit of the control output generated in the step of generating a control output to a value corresponding to a maximum possible value of the current supplied to the positioner.

3. A seeking control method for disk drives as claimed in claim 2, further comprising a step of:

limiting the upper limit of the control output generated in the step of generating a control output to a value corresponding to a maximum possible value of the current supplied to the positioner.

4. A seeking control method for disk drives as claimed in claim 3, wherein:

the reference velocity is determined by calculating moving velocities which are obtained by integrating a time-scaled waveform of design acceleration for driving the read-write means from an end point of positioning towards a starting point for positioning;

each moving velocity corresponds to a number of tracks transformed from each of calculated distances of the read-write means, the distances being obtained by further integrating the results of the above integration, and each integration is performed:

with respect to the reference velocity for the slowdown stage, in an interval from an end point of positioning up to the time of said switching of the reference velocity; and with respect to the reference velocity for the speedup stage, in an interval from an end point of positioning up to time $T_a$ which satisfies the following conditions:

$V(T_a)=V(T_s)+V_{error}$ where $V(T_a)$ is the calculated moving velocity at $T_a$, $V(T_s)$ is the calculated moving velocity at a point when the control output which experienced the step of limiting a rate of change and which belongs to a speedup stage begins to change with a constant slope so as to enter a slowdown stage; and $V_{error}$ is a velocity error necessary for generating a maximum control output which is the control output at a point when the control output which experienced the step of limiting a rate of change and which belongs to a speedup stage begins to change with a constant slope so as to enter a slowdown stage.

5. A seeking control method for disk drives as claimed in claim 3, wherein the comparison level is set to a value at which a difference between the actual moving velocity and the reference velocity which is caused by the limiting of the rate of change is corrected.

6. A seeking control method for disk drives as claimed in claim 1, wherein:

the reference velocity is defined based on different functions for speedup and slowdown stages, and the switching of the reference velocity from a speedup stage to a slowdown stage is performed when the control output which experienced the step of limiting a rate of change enters a slowdown stage with respect to the signal level thereof and reaches a comparison level.

7. A seeking control method for disk drives as claimed in claim 1, wherein:

the reference velocity is defined based on different functions for speedup, constant-speed, and slowdown, and the first switching of the reference velocity from a speedup stage to a constant-speed stage is performed when the control output which experienced the step of limiting a rate of change and which belongs to the speedup stage reaches a comparison level corresponding to a point when the control output converges on zero, and the second switching of the reference velocity from the constant-speed stage to a slowdown stage is performed when the control output which experienced the step of limiting a rate of change enters the slowdown stage with respect to the signal level thereof and reaches a comparison level.

8. A seeking control method for disk drives as claimed in claim 7, further comprising the step of:

limiting the upper limit of the control output generated in the step of generating a control output to a value corresponding to a maximum possible value of the current supplied to the positioner.

9. A seeking control method for disk drives as claimed in claim 7, wherein:

the reference velocity is determined by calculating moving velocities which are obtained by integrating a time-scaled waveform of design acceleration for driving the read-write means from an end point of positioning towards a starting point for positioning;

each moving velocity corresponds to a number of tracks transformed from each of calculated distances of the read-write means, the distances being obtained by further integrating the results of the above integration, and each integration is performed:

with respect to the reference velocity for the slowdown stage, in an interval from an end point of positioning up to the time of said second switching;

with respect to the reference velocity for the constant-speed stage, in an interval from an end point of positioning up to the time of said first switching; and with respect to the reference velocity for the speedup stage, in an interval from an end point of positioning up to time $T_a$ which satisfies the following conditions:

$$V(T_a)=V(T_s)=V_{error}$$

where $V(T_a)$ is the calculated moving velocity at $T_a$, $V(T_s)$ is the calculated moving velocity at a point when the control output which experienced the step of limiting a rate of change and which belongs to a speedup stage begins to change with a constant slope so as to enter a slowdown stage; and $V_{error}$ is a velocity error necessary for generating a maximum control output which is the control output at a point when the control output which experienced the step of limiting a rate of change and which belongs to a speedup stage begins to change with a constant slope so as to enter a slowdown stage.

10. A seeking control method for disk drives as claimed in claim 7, wherein each comparison level is set to a value at which a difference between the actual moving velocity and the reference velocity which is caused by the limiting of the rate of change is corrected.

11. A seeking control method for disk drives as claimed in claim 1, wherein:

the step of limiting a rate of change of the control output lower than a predetermined level is performed by means of limiting the rate of change with respect to a step-form voltage variation of the control output immediately before the conversion into current, and transforming the variation into a variation having constant slope.

12. A seeking control method for disk drives as claimed in claim 1, wherein the disk drive is a magnetic disk drive and the read-write means is a magnetic head.

13. A seeking control method for disk drive as claimed in claim 1, wherein the disk drive is an optical disk drive and the read-write means is a beam.

14. A seeking control apparatus for disk drives, the apparatus comprising:

a reference velocity generator for generating a reference velocity which is defined as a function of the number of residual tracks;

a subtractor for detecting a velocity difference between a moving velocity of a read-write means of a disk drive to be controlled and the reference velocity, and outputting the detected difference;

a proportional amplifier for amplifying the output from the subtractor;

a slew-rate limiter for limiting a rate of change of the control output from the proportional amplifier to be lower than a predetermined level, and outputting a limited output; and a power amplifier for converting the control output from the slew-rate limiter into current supplied to a positioner.

15. A seeking control apparatus for disk drives as claimed in claim 14, further comprising:

an output limiter, inserted between the proportional amplifier and the slew-rate limiter, for limiting the maximum value of the control output from the proportional amplifier.

16. A seeking control apparatus for disk drives as claimed in claim 15, further comprising:

a selector switch, provided between the output limiter and the slew-rate limiter, the switch setting the output limiter to be operational only at the speedup stage of seeking.

17. A seeking control apparatus for disk drives as claimed in claim 14, further comprising:

a feedforward output generator for outputting a feedforward output which corrects the output from the proportional amplifier, the feedforward output being defined as a function of the number of residual tracks; and an adder, inserted between the proportional amplifier and the output limiter, for adding the slew-rate from the proportional amplifier and the output from the feedforward output generator and outputting the added result.

18. A seeking control apparatus for disk drives as claimed in claim 17, further comprising:

a selector switch, provided between the feedforward output generator and the adder, the switch setting the feedforward output generator to be non-operational only at the speedup stage of seeking.

19. A seeking control apparatus for disk drives as claimed in claim 14, wherein:

the reference velocity generator generates the reference velocity which is defined based on different functions for speedup and slowdown stages; and the switching of the reference velocity from the speedup stage to the slowdown stage is performed when the control output from the slew-rate limiter enters a slowdown stage with respect to the signal level thereof and reaches a comparison level.

20. A seeking control apparatus for disk drives as claimed in claim 19, further comprising:

an output limiter, inserted between the proportional amplifier and the slew-rate limiter, for limiting the maximum value of the control output from the proportional amplifier.

21. A seeking control apparatus for the disk drives as claimed in claim 19, wherein the comparison level is set to a value at which a difference between the actual moving velocity and the reference velocity which is caused by the limiting of the rate of change is corrected.

22. A seeking control apparatus for disk drives as claimed in claim 14, wherein:

the reference velocity generator generates the reference velocity which is defined based on different functions for speedup, constant-speed, and slowdown stages;

a first switching of the reference velocity from the speedup stage to the constant-speed stage is performed when the control output from the slew-rate limiter, which belongs to the speed up stage, reaches a comparison level corresponding to a point when the control output converges on zero; and a second switching of the reference velocity from the constant-speed stage to the slowdown stage is performed when the control output from the slew-rate limiter enters a slowdown stage with respect to the signal level thereof and reaches a comparison level.

23. A seeking control apparatus for disk drives as claimed in claim 22, further comprising:

an output limiter, inserted between the proportional amplifier and the slew-rate limiter, for limiting the maximum value of the control output from the proportional amplifier.

24. A seeking control apparatus for disk drives as claimed in claim 22, wherein each comparison level is set to a value at which a difference between the actual moving velocity and the reference velocity which is caused by the limiting of the rate of change is corrected.

25. A seeking control apparatus for disk drives as claimed in claim 14, further comprising:

a selector switch, provided between the slew-rate limiter and the power amplifier, the switch setting the slew-rate limiter to be non-operational at the slowdown stage of seeking.

26. A seeking control apparatus for disk drives as claimed in claim 14, wherein the disk drive is a magnetic disk drive and the read-write means is a magnetic head.

27. A seeking control apparatus for disk drive as claimed in claim 14, wherein the disk drive is an optical disk drive and the read-write means is a beam.

* * * * *